United States Patent [19]

Giori

[11] 4,224,095

[45] Sep. 23, 1980

[54] METHOD OF MAKING A PLATE CYLINDER FOR A WEB PRINTING PRESS

[75] Inventor: Gualtiero Giori, Lonay, Switzerland

[73] Assignee: De La Rue Giori S.A., Lausanne, Switzerland

[21] Appl. No.: 903,696

[22] Filed: May 8, 1978

[30] Foreign Application Priority Data

May 9, 1977 [CH] Switzerland ........................ 5743/77

[51] Int. Cl.² ...................... B32B 31/20; B21D 39/04; B29C 17/02; B41F 27/00

[52] U.S. Cl. .............................. 156/215; 29/148.4 D; 29/523; 29/524; 101/378; 101/382 R; 101/383; 156/150; 156/294; 156/303.1; 156/304.2; 156/330; 264/249; 264/267; 403/297; 428/36; 428/174; 428/188; 428/416; 428/457; 428/908

[58] Field of Search .................. 29/148.4 D, 523, 524; 85/73, 84; 101/375, 378, 382 R, 383; 156/215, 294, 303.1, 304, 330, 150; 264/262, 267, 249; 403/297; 428/416, 457, 174, 188, 36, 908, 909

[56] References Cited

U.S. PATENT DOCUMENTS

| | | | |
|---|---|---|---|
| 3,434,194 | 3/1969 | Whittaker et al. | 29/523 |
| 3,682,094 | 8/1972 | Greis | 101/375 |
| 4,092,193 | 5/1978 | Brooks | 156/294 X |
| 4,113,006 | 9/1978 | Clapp | 29/523 X |

*Primary Examiner*—John T. Goolkasian
*Assistant Examiner*—Robert A. Dawson
*Attorney, Agent, or Firm*—Robert E. Burns; Emmanuel J. Lobato; Bruce L. Adams

[57] ABSTRACT

A method of making a plate cylinder for a web printing press in which a hollow cylinder with a conical interior is formed of ductile steel. Two nickel printing plates are formed to shape so that they will fit virtually exactly around the cylinder without joins between them being readily apparent. A cylindrical mould having two semi-cylindrical mould halves is formed with its inner diameter equal to the outer diameter of the plate cylinder being produced. One mould half is placed with its semi-cylindrical inner surface facing upwards and a printing plate is placed inside. Then the hollow cylinder coated with epoxy resin is placed on this plate, and the other printing plate is placed on the cylinder. The second mould half is secured to the first half, and a conical core is forced into the cylinder to expand it radially so that the plates are held under pressure against the mould surface. Then the mould is heated and the resin allowed to set under conditions of temperature and pressure. Finally the plate cylinder is taken from the mould and the adhered printing plates are chromium plated.

9 Claims, 3 Drawing Figures

METHOD OF MAKING A PLATE CYLINDER FOR A WEB PRINTING PRESS

Figure 1:
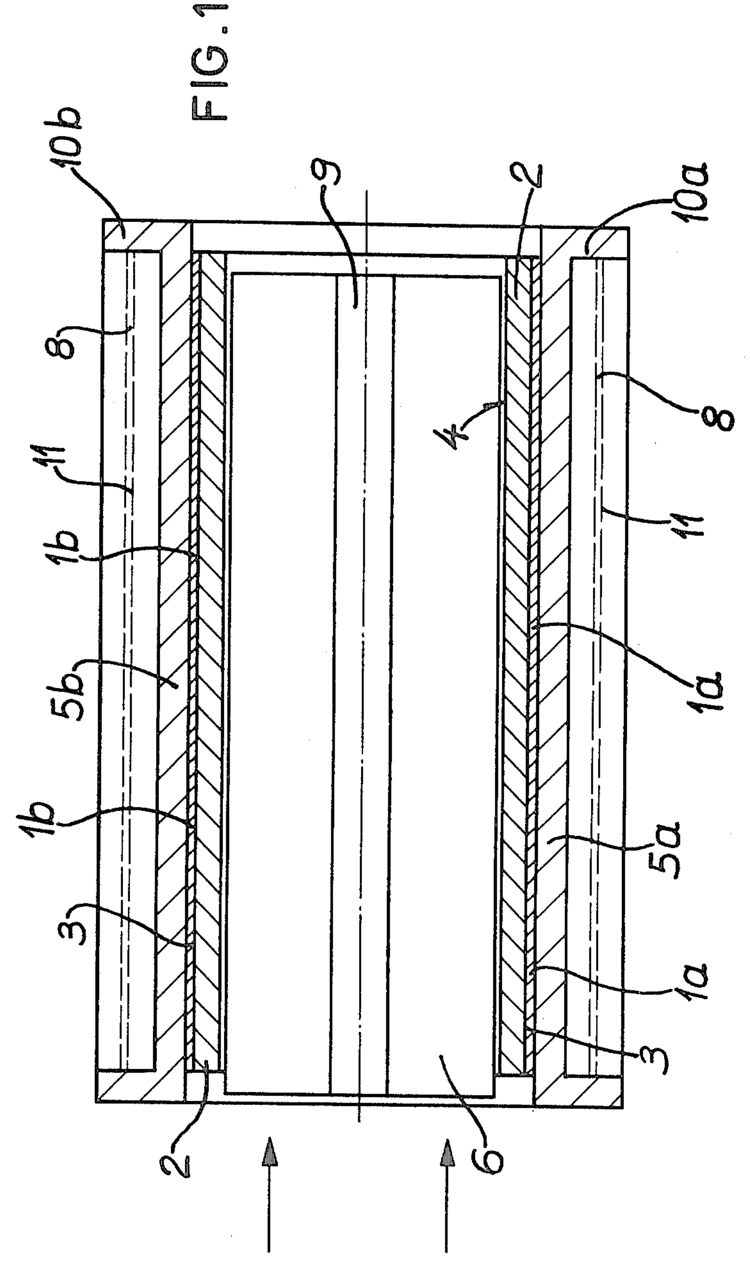

The invention relates to a method for producing a plate cylinder for web printing presses, in particular for intaglio printing.

The main requirements which must be fulfilled by a plate cylinder for web printing presses, i.e. for printing endless paper webs, are exact concentricity for achieving true running, in order that the contact pressure during the printing process and, in the case of intaglio printing, above all during wiping, remains constant, also, a printing plate surrounding the periphery of the plate cylinder virtually without a joint as well as high stability such that the contact forces exerted in particular during the intaglio printing method by the printing cylinder do not cause any deformation of the casing of the plate cylinder. Methods known hitherto, with which these requirements could be fulfilled in a general satisfactory manner, consist essentially in that the printing design is produced on the surface of the plate cylinder either by the transfer method, i.e. by rolling a roller provided with profiles corresponding to the printing design against the surface of the plate cylinder, or, however, by a galvanic method. Both known methods are expensive and complicated.

The invention intends to provide a simpler method, by which it is possible to produce high quality plate cylinders, in particular for intaglio printing of bank notes and postage stamps.

This object is fulfilled according to the invention due to the fact that a cylinder casing of ductile material is prepared and also printing plates are cut and bent such that they surround the outer periphery of the cylinder casing virtually without a joint, that these printing plates are arranged on the cylinder casing with the interposition of a layer of hardenable adhesive, that this cylinder casing provided with the printing plates is inserted in a hollow cylindrical multi-part mould, with an inner diameter corresponding to the outer diameter of the plate cylinder to be produced and is expanded radially to such an extent that the printing plates are pressed against the hollow cylindrical mould at a predetermined pressure, whereupon the adhesive is left to harden and after hardening, the cylinder casing supporting the printing plates is removed from the hollow cylindrical mould.

This method according to the invention has the advantages that firstly, in the normal manner, printing plates, in particular engraved intaglio printing plates, can be produced independently of the subsequent plate cylinder and then these plates can be attached by sticking to the smooth cylinder casing in the manner aforedescribed, in which case the cylindrical hollow mould acting as an abutment on the one hand makes it possible to exert an adequate sticking pressure due to radial expansion of the cylinder casing and on the other hand guarantees the exact concentricity of the latter. Therefore, the method according to the invention is simpler and more economical than production methods known hitherto.

A cylinder casing is preferably produced with its inner periphery forming a hollow cone and is expanded radially in the hollow cylindrical mould by pressing a conical core into the hollow cone. In this way, the radial contact pressure or radial expansion of the cylinder casing can be achieved in a particularly simple manner and accurately to the desired extent.

Advantageously, a film of a commerically available epoxide based adhesive can be used as the adhesive layer, in which case, for the purpose of hardening the adhesive film, when the hollow cylindrical mould is closed, the entire arrangement is heated and kept at a predetermined temperature for a certain period of time.

The printing plates to be located on the cylinder casing may preferably be engraved nickel plates which, after being attached to the cylinder casing, i.e. after completing the plate cylinder, are chromium-plated in a suitable gavanic bath.

The cylinder casing and the conical core preferably consist of steel or a steel alloy.

The apparatus for carrying out the method according to the invention is characterised by a two-part hollow cylindrical mould with an exactly concentric inner periphery adapted to the outer diameter of the plate cylinder to be produced and by a conical core whose conicity corresponds to that of the hollow cone of the cylinder casing.

A plate cylinder produced according to the method of the invention is characterised by the fact that it comprises a cylinder casing and curved printing plates stuck thereto, which plates surround the cylinder casing virtually without a joint.

Figure 2:
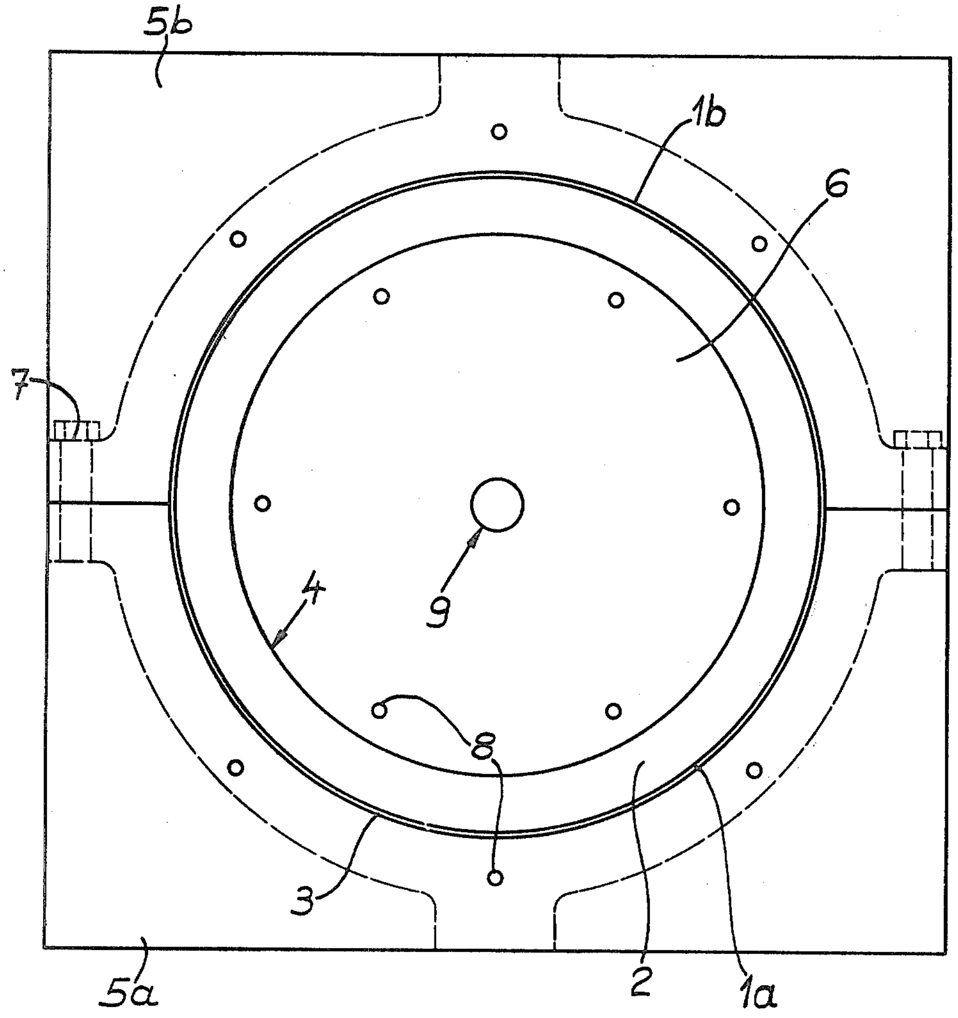
Figure 3:
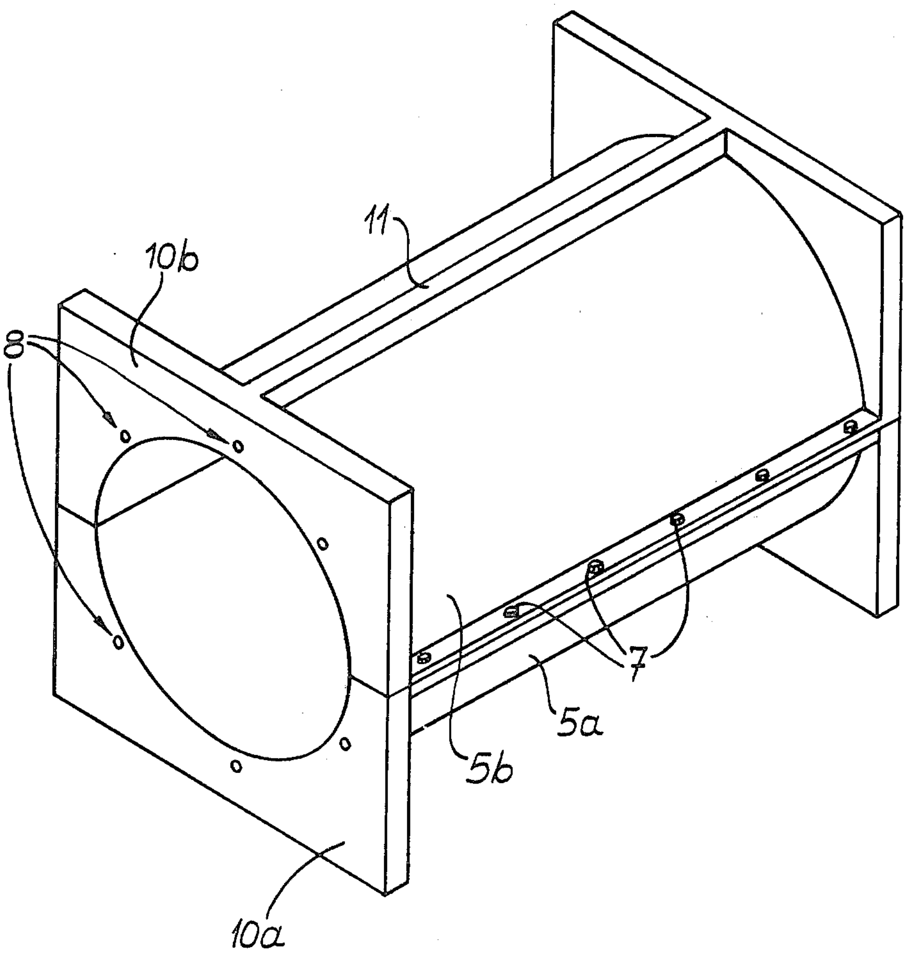

The invention is described in detail with reference to the drawings as regards one example of carrying out the method and one embodiment of the corresponding apparatus:

FIG. 1 is an axial section through the closed hollow cylindrical mould, in which the cylinder casing with the printing plates located thereon, with the interposition of an adhesive layer and the conical core inserted in the hollow cone of the cylinder casing are located, FIG. 2 is an end view of the arrangement according to FIG. 1 and FIG. 3 is a perspective view of the closed hollow cylindrical mould.

As a support for the printing plates of the plate cylinder, a cylinder casing 2 of a suitable ductile material, preferably a steel alloy, is produced, the inner periphery of which is constructed as a hollow cone 4, the conicity amounting to 2° for example. Furthermore, a conical core 6 is produced, likewise from a suitable steel alloy, whose conicity corresponds to that of the hollow cone 4 of the cylinder casing 2. The inner periphery of the cylinder casing 2 and the outer periphery of the conical core 6 are cleaned with a suitable solvent and then the conical core 6 is pushed into the hollow cone 4 of the cylinder casing 2 to such an extent that it is held in the latter with a slight interference fit.

On the other hand, two printing plates 1*a* and 1*b*, in particular engraved nickel plates, are produced according to known methods and cut and bent such that their radius corresponds to that of the cylinder casing 2 and they surround the outer periphery of the latter virtually without a joint.

After the end faces of the cylinder casing 2 provided with the conical core 6 have been covered with dust caps, the surfaces which are to be subsequently stuck together, i.e. the outer periphery of the cylinder casing 2 and the inner surfaces of the curved printing plates 1*a* and 1*b* are sand-blasted or shot-blasted and then degreased with perchloroethylene. In order to prevent excess adhesive material from subsequently sticking to the printing plates, their outer printing surfaces are covered with a mould parting compound.

Immediately after de-greasing of the cylinder casing 2, a layer 3 of hardenable adhesive is applied to the periphery of the latter. For this purpose, it has been found that a commerically available epoxy resin based adhesive film with a thickness of 0.02 to 0.05 mm is particularly suitable. Tests were carried out for example with adhesive films having a thickness of 0.02 and 0.4 mm, which are sold under the trade names REDUX 312 UL by Ciba-Geigy and FM 123/5 by the U.S. company Cyanamid. Whilst avoiding air pockets, the adhesive film hardening in the heat is rolled around the cylinder casing 2 so that the edges overlap. The overlap is then cut with a knife such that the overlap region of the adhesive film can be removed by forming a perfect butt joint.

In addition, a hollow cylindrical mould preferably of steel is prepared, which consists of two semi-cylindrical partial moulds 5*a* and 5*b*. In the assembled state, this mould has an exactly concentric inner periphery and an inner diameter corresponding to the outer diameter of the plate cylinder to be produced, generally amounting to between 20 and 30 cm. In order to strengthen this hollow cylindrical mould, flanges 10*a* and 10*b* are provided on the end faces of the partial moulds 5*a* and 5*b*, which flanges in the assembled state, form a square flange. Furthermore, on both end faces, the flanges are interconnected by strengthening ribs 11, which are formed on the periphery of the partial moulds 5*a* and 5*b*. Diametrically opposed ribs serve to receive securing bolts 7, by which the two partial moulds 5*a* and 5*b* are secured one to another.

After the inner periphery of the partial moulds 5*a* and 5*b* has been cleaned and covered with a mould parting compound, the first semi-cylindrical curved printing plate 1*a* is inserted in the first partial mould 5*a* arranged horizontally and with its concave inner surface directed upwards. Then, the cylinder casing 2 covered with the adhesive film 3 is lowered onto this printing plate 1*a*, the second printing plate 1*b* is placed on the metal cylinder 2 and finally the second partial mould 5*b* is put in position and fixed to the lower partial mould 5*a* by means of the securing bolts 7.

After the completion of this arrangement, the conical core 6 is pressed axially into the hollow cone 4 of the cylinder casing 2 in the direction of the arrows in FIG. 1, in which case the cylinder casing 2 is expanded radially to such an extent that the printing plates 1*a* and 1*b* are pressed with a predetermined pressure against the hollow conical mould 5*a* and 5*b*. In the example in question, this expansion causes an increase in the diameter of approximately 0.2 mm and the contact pressure produced in this way, which thus provides the necessary adhesive force for perfect connection of the printing plates 1*a* and 1*b* to the surface of the cylinder casing 2, amounts to 200–350 $N/cm^2$ (Newtons per square centimeter). Therefore, the dimensions of the hollow cylindrical mould 5*a*, 5*b* are such that its inner diameter is approximately 0.2 mm greater than that of the cylinder casing supporting the printing plates before its expansion.

Subsequently, to harden the adhesive layer 3, the arrangement is heated to a temperature of 120° C. and maintained at this temperature for approximately 30 minutes. In order to obtain uniform heating, in the example in question, in the vicinity of its periphery, both the conical core 6 as well as the partial moulds 5*a* and 5*b* of the hollow cylindrical mould are provided with axis-parallel heating elements 8, which are preferably electrical heating elements. After hardening is completed, the entire arrangement is cooled, for example by means of a coolant flowing through the central bore 9 of the core 6, the conical core 6 is removed and the hollow cylindrical mould 5*a*, 5*b* is opened for the removal of the cylinder casing 2 provided with the printing plates 1*a*, 1*b*.

Then, if necessary, any excess adhesive is removed, the surfaces of the printing plates 1*a* and 1*b* are polished and carefully de-greased with perchloroethylene.

The last stage of the treatment consists of immersing the cylinder casing 2 supporting the printing plates 1*a*, 1*b* in an electrolytic chromium plating bath and in this way of providing the nickel plates with a layer of chromium having a depth of approximately 25 microns, whereupon the plate cylinder which is now complete is washed.

The invention is not limited to the afore-described stages of the method and the afore-described apparatus for carrying out the method, but may have numerous variations. Thus, in particular the radial expansion of the cylinder casing for producing adequate contact pressure of the printing plates against the hollow cylindrical mould and thus for producing secure adhesion of the printing plates on the cylinder casing may also be brought about with means other than those described. Therefore, secure adhesion of the printing plates to the cylinder casing is necessary, because during the printing operation and in the case of intaglio printing, also during wiping, the printing plates are subjected to considerable tangential forces however without their being any danger of displacement of the printing plates on the periphery of the cylinder casing or plate cylinder.

What is claimed is:

1. A method of producing a plate cylinder for web printing presses, comprising providing a hollow cylindrical multi-part mould having a right circular cylindrical inner surface which is precisely concentric and has a diameter corresponding to the outer diameter of the plate cylinder to be produced, preparing a cylinder casing of ductile material with an outer diameter smaller than the inner diameter of said mould, preparing arcuate printing plates and assemblying said plates edge-to-edge on said cylinder casing with a layer of hardenable adhesive between said cylinder casing and said plates, the edges of said plates being in abutment with one another positioning said cylinder casing with said plates thereon in said mould, applying pressure internally of said cylinder casing to expand said cylinder casing radially and thereby press said plates against said cylinder casing and make said cylinder casing with said plates thereon conform to said cylindrical inner surface of said mould, maintaining such pressure while hardening said adhesive to bond said plates to said cylinder casing, and thereafter removing the resulting plate cylinder from said mould.

2. A method according to claim 1, in which said cylinder casing is formed with a hollow conically tapered interior, and in which said cylinder casing is expanded radially by pressing axially into said cylinder casing a conically tapered core having the same taper as said cylinder casing.

3. A method according to claim 1, in which there are two plates and said mould comprises two halves, and in which one plate is placed in one half of said mould, said cylinder casing with an adhesive film thereon is placed on said one plate, the second of said plates is placed on said cylinder casing and the second half of said mould is placed over said second plates and secured to said first half.

4. A method according to claim 1, in which said adhesive is applied as a film wrapped around said cylinder casing with end edges of said film butted.

5. A method according to claim 1, in which said adhesive is heat-hardenable and is hardened by heating said cylinder casing and plates while in said mould with said pressure applied.

6. A method according to claim 1, in which said radial pressure with which said plates are pressed between said cylinder casing and said mould is between 200 to 350 $N/cm^2$.

7. A method according to claim 1, in which said plates are made of nickel and are electrolytrically chrome plated after removal of said plate cylinder from said mould.

8. A method according to claim 1, in which said cylinder casing is formed of steel.

9. A method according to claim 1, in which said adhesive is heat hardenable and is applied as a film having a thickness of the order of 0.02 to 0.04 mm.

* * * * *